(12) United States Patent
Kassa et al.

(10) Patent No.: US 9,965,320 B2
(45) Date of Patent: May 8, 2018

(54) PROCESSOR WITH TRANSACTIONAL CAPABILITY AND LOGGING CIRCUITRY TO REPORT TRANSACTIONAL OPERATIONS

(71) Applicant: Intel Corporation, Santa Clara, CA (US)

(72) Inventors: Rolf Kassa, Braunschweig (DE); Justin E. Gottschlich, Santa Clara, CA (US); Shiliang Hu, Los Altos, CA (US); Gilles A. Pokam, Fremont, CA (US); Robert C. Knauerhase, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/142,475

(22) Filed: Dec. 27, 2013

(65) Prior Publication Data

US 2015/0186178 A1 Jul. 2, 2015

(51) Int. Cl.
*G06F 9/46* (2006.01)
*G06F 15/00* (2006.01)
*G06F 9/52* (2006.01)
*G06F 11/07* (2006.01)

(52) U.S. Cl.
CPC .............. *G06F 9/467* (2013.01); *G06F 9/528* (2013.01); *G06F 11/0724* (2013.01); *G06F 11/0772* (2013.01)

(58) Field of Classification Search
CPC .............. G06F 9/467; G06F 2212/452; G06F 12/0875; G06F 2212/62; G06F 11/0751; G06F 11/08
See application file for complete search history.

(56) References Cited

U.S. PATENT DOCUMENTS

| | | |
|---|---|---|
| 5,740,461 A | 4/1998 | Jaggar |
| 5,996,064 A | 11/1999 | Zaidi et al. |
| 6,009,256 A | 12/1999 | Tseng et al. |
| 7,188,290 B2 | 3/2007 | Kassa |
| 7,376,798 B1 | 5/2008 | Rozas |

(Continued)

FOREIGN PATENT DOCUMENTS

| | | |
|---|---|---|
| WO | 20130147898 A1 | 3/2013 |
| WO | 20130115816 A1 | 8/2013 |
| WO | 20140052637 A1 | 4/2014 |

OTHER PUBLICATIONS

Min Xu et al.; A Regulated Transitive Reduction (RTR) for Longer Memory Race Recording; 2006 ACM; pp. 49-60; <http://dl.acm.org/citation.cfm?id=1168865>.*

(Continued)

*Primary Examiner* — Thuy Dao
*Assistant Examiner* — Cuong V Luu
(74) *Attorney, Agent, or Firm* — Nicholson De Vos Webster & Elliott LLP

(57) ABSTRACT

A processor is described comprising memory access conflict detection circuitry to identify a conflict pertaining to a transaction being executed by a thread that believes it has locked information within a memory. The processor also includes logging circuitry to construct and report out a packet if the memory access conflict detection circuitry identifies a conflict that causes the transaction to be aborted.

24 Claims, 8 Drawing Sheets

(56) References Cited

U.S. PATENT DOCUMENTS

| | | | |
|---|---|---|---|
| 7,441,107 B2* | 10/2008 | Hammond | G06F 9/3824 712/216 |
| 7,945,741 B2* | 5/2011 | Shen et al. | 711/150 |
| 8,312,455 B2* | 11/2012 | Bell, Jr. | G06F 9/4843 712/220 |
| 8,539,486 B2* | 9/2013 | Cain, III | G06F 9/528 718/101 |
| 8,544,006 B2* | 9/2013 | Bell, Jr. | G06F 9/3842 718/100 |
| 8,806,270 B2 | 8/2014 | Adir et al. | |
| 8,881,153 B2* | 11/2014 | Giampapa | G06F 9/467 712/200 |
| 9,128,781 B2 | 9/2015 | Kranich et al. | |
| 9,298,469 B2* | 3/2016 | Busaba | G06F 9/44 |
| 2006/0236136 A1 | 10/2006 | Jones | |
| 2007/0143276 A1 | 6/2007 | Harris | |
| 2007/0283102 A1 | 12/2007 | Corrigan et al. | |
| 2007/0294702 A1 | 12/2007 | Melvin et al. | |
| 2008/0019209 A1 | 1/2008 | Lin | |
| 2008/0062786 A1 | 3/2008 | Kim et al. | |
| 2008/0098184 A1 | 4/2008 | Huras et al. | |
| 2008/0109641 A1 | 5/2008 | Ball et al. | |
| 2008/0163220 A1 | 7/2008 | Wang et al. | |
| 2009/0019209 A1* | 1/2009 | Shen et al. | 711/100 |
| 2009/0043845 A1 | 2/2009 | Garza et al. | |
| 2009/0046851 A1 | 2/2009 | Elmegaard-Fessel | |
| 2009/0077540 A1 | 3/2009 | Zhou et al. | |
| 2009/0138890 A1* | 5/2009 | Blake | G06F 9/466 718/106 |
| 2009/0164759 A1* | 6/2009 | Bell, Jr. | G06F 9/3842 712/216 |
| 2009/0172305 A1 | 7/2009 | Shpeisman et al. | |
| 2009/0172317 A1 | 7/2009 | Saha et al. | |
| 2009/0319739 A1 | 12/2009 | Shpeisman et al. | |
| 2010/0005255 A1 | 1/2010 | Kaushik et al. | |
| 2010/0058034 A1* | 3/2010 | Zaks | G06F 8/433 712/216 |
| 2010/0162250 A1 | 6/2010 | Adl-Tabatabai et al. | |
| 2010/0169623 A1* | 7/2010 | Dice | G06F 9/3842 712/229 |
| 2010/0251031 A1 | 9/2010 | Nieh et al. | |
| 2010/0325376 A1 | 12/2010 | Ash et al. | |
| 2011/0010712 A1 | 1/2011 | Thober et al. | |
| 2011/0016470 A1* | 1/2011 | Cain, III | G06F 9/528 718/101 |
| 2011/0022893 A1 | 1/2011 | Yang et al. | |
| 2011/0029101 A1 | 2/2011 | Scorsi et al. | |
| 2011/0172968 A1 | 7/2011 | Davis et al. | |
| 2011/0264959 A1 | 10/2011 | Subhraveti | |
| 2011/0271017 A1 | 11/2011 | Shpeisman et al. | |
| 2011/0276783 A1 | 11/2011 | Golla et al. | |
| 2012/0011491 A1 | 1/2012 | Eldar | |
| 2012/0079246 A1 | 3/2012 | Breternitz et al. | |
| 2012/0174083 A1 | 7/2012 | Shpeisman et al. | |
| 2012/0204062 A1 | 8/2012 | Erickson et al. | |
| 2012/0227045 A1* | 9/2012 | Knauth | G06F 9/3863 718/100 |
| 2012/0239987 A1 | 9/2012 | Chow et al. | |
| 2013/0047163 A1 | 2/2013 | Marathe et al. | |
| 2013/0159678 A1* | 6/2013 | Koju | G06F 8/4441 712/220 |
| 2013/0205119 A1* | 8/2013 | Rajwar | G06F 9/3842 712/208 |
| 2013/0219367 A9 | 8/2013 | Zhou et al. | |
| 2013/0339687 A1 | 12/2013 | Greiner et al. | |
| 2013/0339688 A1* | 12/2013 | Busaba | G06F 9/44 712/233 |
| 2014/0040551 A1* | 2/2014 | Blainey et al. | 711/122 |
| 2014/0089642 A1 | 3/2014 | Gottschlich et al. | |
| 2014/0115590 A1* | 4/2014 | Blainey | G06F 9/467 718/101 |
| 2014/0281274 A1 | 9/2014 | Pokam et al. | |
| 2014/0298342 A1* | 10/2014 | Michael | G06F 17/30362 718/101 |
| 2016/0154648 A1* | 6/2016 | Dixon | G06F 9/3004 712/205 |

OTHER PUBLICATIONS

David M. Gallagher et al.; Dynamic Memory Disambiguation Using the Memory Conflict Buffer; 1994 ACM; pp. 183-193; <http://dl.acm.org/citation.cfm?id=195534>.*

Maurice Herlihy et al.; Transactional Memory Support for Lock-Free Data Structures; 1993 IEEE; pp. 289-300; <http://dl.acm.org/citation.cfm?id=165164>.*

Scott Rixner et al.; Memory Access Scheduling; 2000 ACM; pp. 128-138; <http://dl.acm.org/citation.cfm?id=339668>.*

George Z. Chrysos et al.; Memory Dependence Prediction using Store Sets; 1998 IEEE; pp. 142-153; <http://dl.acm.org/citation.cfm?id=279378>.*

Sheldon S. L. Chang; Multiple-Read Single Write Memory and Its Applications; 1980 IEEE; pp. 689-694; <http://ieeexplore.ieee.org/stamp/stamp.jsp?arnumber=1675650>.*

Sarita V. Adve et al.; Detecting Data Races on Weak Memory Systems; 1991 ACM; pp. 234-243; <https://dl.acm.org/citation.cfm?id=115976>.*

Gilles Pokam et al.; CoreRacer A Practical Memory Race Recorder for Multicore x86 TSO Processors; 2011 ACM; pp. 216-225; <https://dl.acm.org/citation.cfm?id=2155646>.*

Milos Prvulovic; CORD Cost effective (and nearly overhead-free) Order Recording and Data race detection; 2006 IEEE; pp. 236-247; <http://ieeexplore.ieee.org/stamp/stamp.jsp?tp=&arnumber=1598132>.*

Joseph Devietti et al.; DMP Deterministic Shared Memory Multiprocessing; 2009 ACM; pp. 85-96; <https://dl.acm.org/citation.cfm?id=1508255>.*

John Erickson et al.; Effective Data-Race Detection for the Kernel ; 2010 OSDI; 12 pages; <https://www.usenix.org/legacy/event/osdi10/tech/full_papers/Erickson.pdf>.*

Shantanu Gupta et al; Using Hardware Transactional Memory for Data Race Detection; 2009 IEEE; 11 pages; <http://ieeexplore.ieee.org/stamp/stamp.jsp?tp=&arnumber=5161006>.*

Extended European Search Report from European Patent Application No. 14194407.4, dated Apr. 17, 2015, 6 pages.

Notice of Allowance from U.S. Appl. No. 13/729,718, dated Apr. 30, 2015, 8 pages.

Xu, Min et al., "A Hardware Memory Race Recorder for Deterministic Replay", Published by the IEEE Computer Society, Jan.-Feb. 2007, pp. 48-55.

Office action from U.S. Appl. No. 13/844,817, dated Jan. 12, 2015, 23 pages.

Final Office action from U.S. Appl. No. 13/844,817, dated Jun. 5, 2015, 25 pages.

Pokam, Gilles et al., "Core Racer: A Practical Memory Race Recorder for Multicore x86 TSO Processors", MICRO'11, Dec. 3-7, 2011, Copyright 2011; 10 pages.

Office action from U.S. Appl. No. 13/629,131, dated Jul. 20, 2015, 4 pages.

Notice of Allowance from U.S. Appl. No. 13/629,131, dated Dec. 17, 2015, 7 pages.

PCT/US2013/061990 Written Opinion of the International Searching Authority, dated Jan. 29, 2014, 5 pages.

PCT/US2013/061990 International Search Report, dated Jan. 29, 2014, 3 pages.

Hower, D.R. et al., "Rerun: Exploiting Episodes for Lightweight Memory Race Recording", in Proceedings of International Symposium on Computer Architecture, Jun. 2008, 12 pages.

Pokam, G. et al., "Architecting a Chunk-based Memory Race Recorder in Modem CMPs", MICRO, 2009, 11 pages.

PCT/US2013/061990 International Preliminary Report on Patentability, dated Mar. 31, 2015, 6 pages.

Office action from U.S. Appl. No. 13/844,817, dated Jan. 15, 2016, 25 pages.

(56) References Cited

OTHER PUBLICATIONS

Final Office action from U.S. Appl. No. 13/844,817, dated Jun. 15, 2016, 37 pages.
Office action from U.S. Appl. No. 13/844,817, dated Mar. 23, 2017, 41 pages.
Notice of Allowance from U.S. Appl. No. 13/844,817, dated Dec. 22, 2017, 9 pages.
Office Action from European Patent Application No. 14194407.4, dated Mar. 11, 2016, 5 pages.

* cited by examiner

400

| FMT | CTR | TSD | CS | RSW | TSW |

FIG. 4

PROCESSOR WITH TRANSACTIONAL CAPABILITY AND LOGGING CIRCUITRY TO REPORT TRANSACTIONAL OPERATIONS

FIELD OF INVENTION

The field of invention pertains to the computing sciences and, more specifically, to a processor with transactional capability and logging circuitry to report transactional operations.

BACKGROUND

Multi-core processors and/or multi-threaded instruction execution pipelines within processing cores have caused software programmers to develop multi-threaded software programs (as opposed to single threaded software programs). Multi-threaded software is naturally complex because of the different processes that concurrently execute. However, multi-threaded software is additionally difficult to debug because of an aspect of "non-determinism" in the manner of its execution. Specifically, a multi-threaded software program may execute differently across two different run-times even if the program starts from an identical input state.

For these reasons "logging" is used to record certain critical junctures in a multi-threaded software program's execution. Processors are presently designed with logging circuits that observe the execution of a processor's software and record certain critical events that the circuits have been designed to detect. If the software program crashes, the log record is analyzed to study the execution of the program leading up to the crash.

BRIEF DESCRIPTION OF THE DRAWINGS

The present invention is illustrated by way of example and not limitation in the figures of the accompanying drawings, in which like references indicate similar elements and in which:

FIG. 4 shows a packet structure.

DETAILED DESCRIPTION

Figure 1:
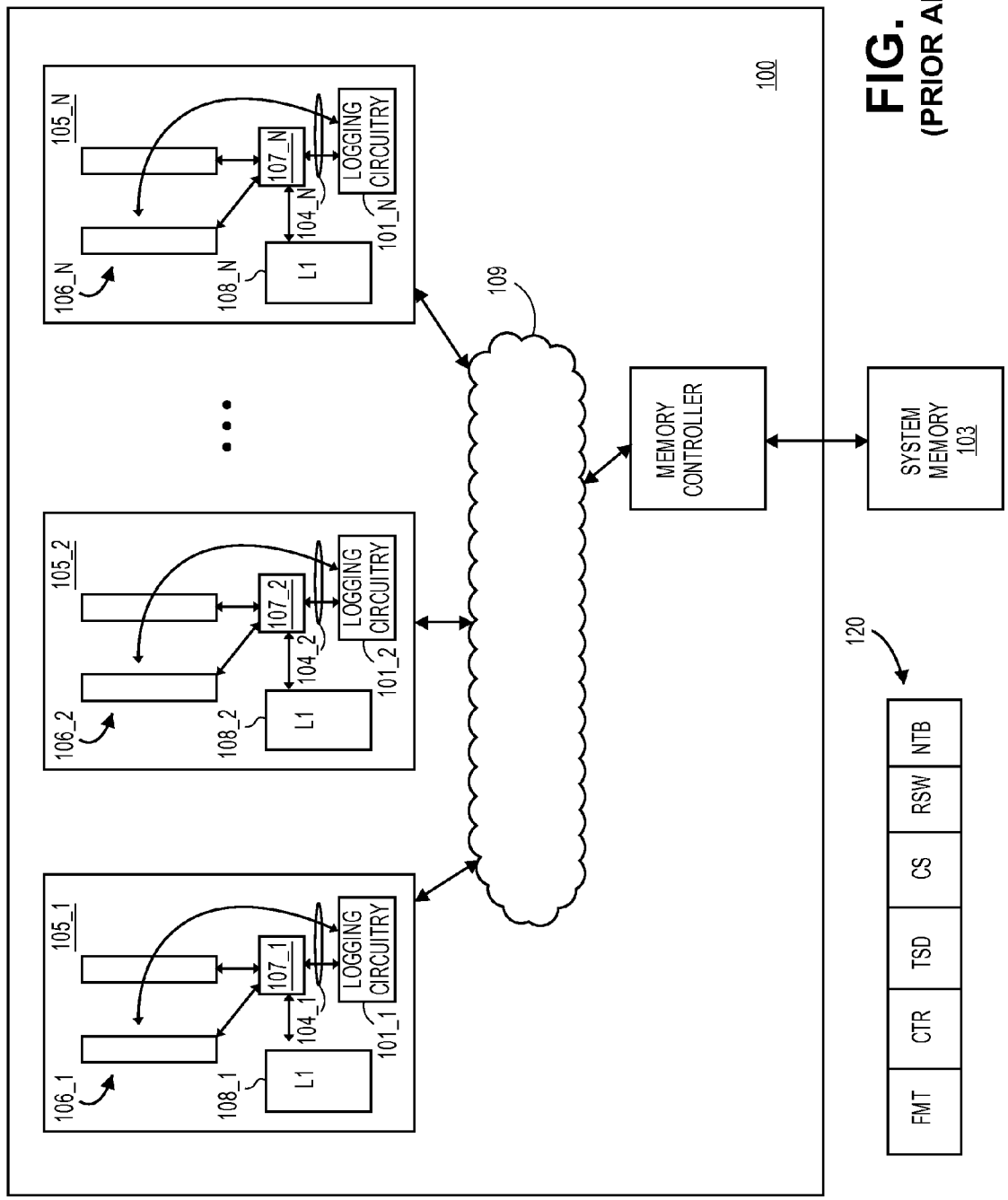
FIG. 1 (prior art) shows a processor.

FIG. 1 shows a prior art processor 100 implemented on a semiconductor chip having logging circuitry 101_1 through 101_N for tracking specific aspects of multi-threaded program flow and recording such aspects externally from the processor 100 so that the program's execution can be later studied and understood. In an implementation, each instance of the processor logging circuitry 101_1 through 101_N is designed to look at each thread of its local processing core as being executed in "chunks" where certain, specific looked for events terminate a chunk. By storing the sequence of chunks for each thread in a storage location such as system memory 103 memory, the multi-threaded execution of a larger multi-threaded program that perhaps executes threads across all cores 105_1 through 105_X can be thoroughly analyzed.

Each instance of logging circuitry is assigned a specific region of system memory 103 in which to store its respective chunks. Each hardware thread executed by a particular core is allocated its own respective space within the system memory region allocated to the logging circuitry. Here, as is known in the art, a single instruction execution pipeline can concurrently execute multiple hardware threads (e.g., 8 hardware threads). Moreover, each processing core can contain more than one instruction execution pipeline (e.g., FIG. 1 shows each core having two instruction execution pipelines 106).

Hardware threads are understood to be the threads actively being executed within an instruction execution pipeline. Instruction execution pipelines are typically designed to concurrently execute a maximum/limited number of hardware threads where the maximum/limit is set by the hardware design of the pipeline. A software thread is understood to be a singular stream of program code instructions. The number of software threads supported by a processor can greatly exceed the number of hardware threads. A software thread is recognized as also being a hardware thread when the thread's state/context information is switched into an instruction execution pipeline. The software thread loses its hardware thread status when its state/context is switched out of the instruction execution pipeline. In one embodiment, there is one instance of logging circuitry per hardware thread (for simplicity FIG. 1 only shows one logging circuit per core).

In an implementation, a logging circuitry instance (e.g., instance 101_1) is designed to terminate a chunk for a thread on any of the following conditions: 1) a memory race condition; 2) a switch of the thread from an active to a hibernated state; 3) a translation look-aside-buffer (TLB) invalidation; 4) a transition of the thread outside a privilege level it was configured for (e.g., the thread transitions from a "user" privilege level to a "kernel" privilege level in response to an interrupt or exception); 5) the thread attempts to access an un-cacheable memory region. Here, any of the above described events contribute to the non-deterministic manner in which multi-threaded programs execute.

FIG. 1 also shows an inset 120 the prior art structure of a packet for a chunk of a particular thread. As observed at inset 120 the packet includes: 1) a packet format identifier (FMT); 2) the termination reason for the chunk (CTR); 3) a differential timestamp (time between this packet and previous chunk's packet) (TSD); 4) the number of instructions that were executed by the chunk between the thread's previous chunk's termination and the chunk's termination (CS); 5) the number of outstanding writes for the chunk (i.e., the number of retired but not yet globally visible (committed) store operations)(RSW); 6) the number of retired load/store operations of the oldest not yet retired macro instruction (NTB). In an embodiment, the core ID and the thread ID are added by a software layer which can determine both based on where the chunk is stored in system memory 103.

Here, each logging circuitry instance 101_1 through 101_N is coupled to "hooks" 104_1 through 104_N in their respective processing cores 105_1 through 105_N of the processor (e.g., in the vicinity of the instruction execution pipelines 106_1 through 106_N that execute the respective instruction streams of the various software threads) that are designed to detect the looked for chunk termination events. During execution of a particular thread, the various hooks detect a chunk termination event for the thread and report the event to the logging circuitry 101. In response, the logging circuitry 101 formulates a packet consistent with the structure of inset 120 and causes the packet to be written to external memory 103.

One of these hooks within each core is coupled to a memory race detection circuit 107_1 through 107_N. As observed in FIG. 1, there is one memory race detection circuit for each processing core coupled proximate to the core's L1 cache 108_1 through 108_N. Each memory race circuit 107_1 through 107_N is designed to detect memory races at its associated L1 cache.

A memory race occurs when two different software processes (e.g., two different threads) try to access the same memory location. Here. each thread remembers all memory accesses (addresses) of the current chunk. A chunk is terminated and a new chunk is created when a conflict to one of the addresses remembered by the current chunk is detected (no matter how long this access is in the past).

Notably a race can be caused when two different threads on a same core attempt to access the same memory location or when two different threads on two different cores attempt to access the same memory location. In the case of the later, a first core will snoop a second core's L1 cache. Here, interconnection network 109 is used to transport such snoops.

Each memory race detection circuit 107_1 through 107_N tracks recent read operations and recent write operations (referred to as "read sets" and "write sets") and compares them to incoming read requests and incoming write requests. A memory race circuit will detect a memory race condition anytime it detects concurrent "read-after-write" (RAW), "write-after-write" (WAW) or "write-after-read" (WAR) operations directed to the same memory address. In various embodiments, the identity of the conflicting address may optionally be included in the chunk (depending on whether larger or smaller chunks are desired) that is recorded for a memory race.

Figure 2:
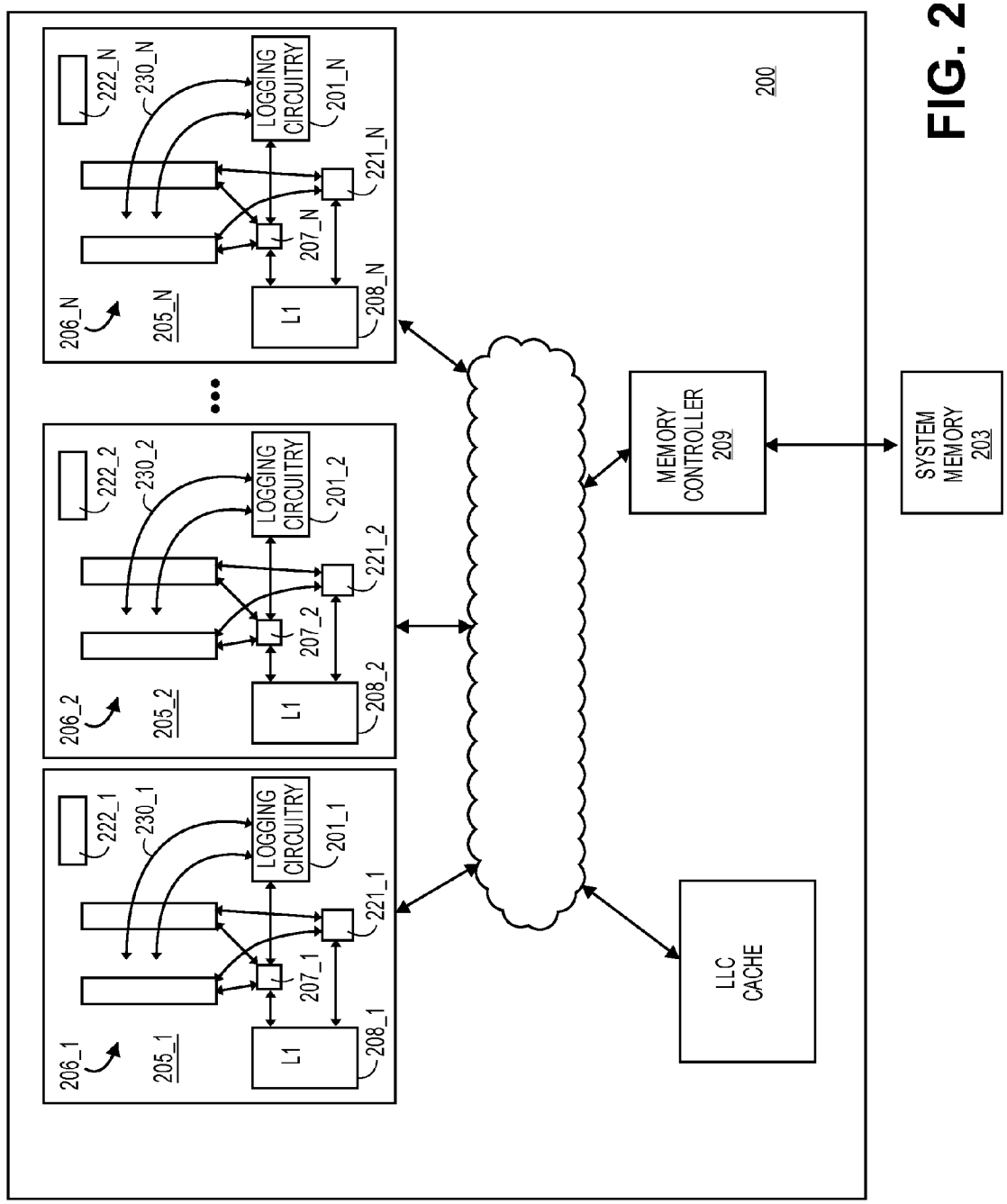
FIG. 2 shows an improved processor.

FIG. 2 shows an improvement to the prior art processor of FIG. 1. Here, the improved processor of FIG. 2 in an embodiment assumes all of the functionality described above with respect to FIG. 1 plus the additional improvements described immediately below.

As observed in FIG. 2, the processor's individual cores 205_1 through 205_N include the additional capability of executing "transactions". The execution of transactions corresponds to execution of speculative code well beyond traditional speculative execution boundaries. Traditional speculative execution, such as branch prediction, permits an instruction execution pipeline to execute a program along a program branch before confirmation that the direction taken was the correct program flow path. Here, results of executed instructions are contained (e.g., in a reorder buffer) internal to the pipeline but not written externally to a processor's architectural state (registers). As such, results of the speculatively executed instructions are not globally visible. If the predicted branch is incorrect the pipeline is flushed and program flow restarts from the incorrectly predicted branch. If the prediction is correct, the instruction results are committed to the architectural state external to the pipeline for global viewing by other processes. In general, however, the amount of data changes that can be contained is of limited size and therefore the amount of speculatively executed code is limited.

By contrast, processing cores that support transactions permit speculative execution well beyond the type of speculative execution discussed above (although the cores of FIG. 2 may also be designed to include branch prediction). In the case of transactions, processes are able to execute "as if" they have placed locks on shared items of data. In a basic approach, a process (e.g., a software thread) acquires a lock on an entire database (e.g., an entire shared memory, such as LLC cache and/or system memory 203 or region thereof where the process's data is kept). The process executes some logic and, upon completion of the logic, determines that changes need to be made to one or more of the data items. The process then "commits" the data items to the database and releases the lock on the database thereby permitting other processes to access the data items.

In an implementation, the execution pipelines 206_1 through 206_N of the processor have enhanced functional units to support instructions (e.g., XACQUIRE and XRELEASE) that permit a software thread to believe it has locked a database as described above. That is, the XACQUIRE instruction when executed announces the beginning of speculative execution and the acquisition of a lock on a database. The XRELEASE instruction when executed announces the end of speculative execution and the release of the lock on a database. Importantly, in an implementation, the underlying hardware of the processor 200 acts more to let the software thread believe it has placed a lock on the database when, in fact, it has technically not locked the entire database, but rather, caused conflict detect hardware 221 within the processor to look for and enforce serial operation between competing threads for a same data item.

Here, it should be clear that permitting a first software thread to lock an entire database can hurt performance if there exists another parallel thread that would like to use the same database. The second thread would have no choice but to wait until the first thread commits its data to the database and releases the lock. In effect, actually locking an entire database would cause two concurrent threads that use the same database to execute serially rather than in parallel.

As such, the XACQUIRE instruction has the effect of "turning on" conflict detect hardware 221 within the processor that understands the database (e.g., system memory or a specific portion thereof) is supposed to "behave as if locked". This means the conflict detect hardware 221 will permit another process to access the database so long as the access does not compete with the accesses made by the process that executed the XACQUIRE instruction and believes it has acquired a lock (here, a competing access is understood to mean a same memory address). If competing accesses are detected, the thread is "aborted" which causes the transaction's state to flush and the program to return to the XACQUIRE instruction to restart another attempt for the transaction. Here, the conflict detection circuitry 221 detects when another process has attempted to access a same memory location as a transaction that has executed XACQUIRE and is executing within a speculative region of code.

In another implementation, the processor also supports additional instructions that permit more advanced transactional semantics (e.g., XBEGIN, XEND and XABORT). XBEGIN and END act essentially the same as XACQUIRE and XRELEASE, respectively. Here, XBEGIN announces the beginning of speculative execution (turns on conflict detection circuitry 221) and XEND announces the end of speculative execution (turns off conflict detection circuitry 221). Operation is as discussed above except that a transaction abort leaves an error code in control register space 222 (e.g., EAX model specific register space implemented with one or more register circuits) of a core that executed the aborted thread providing more details about the abort (e.g., abort caused by ABORT instruction, transaction may succeed on retry, conflict caused abort, internal buffer overflowed, debug breakpoint was hit, abort occurred during nested transaction).

The information left in the register space 222 can be used to direct program flow after an abort to other than into an automatic retry of the transaction Additionally, the processor may support an instruction (e.g., XABORT) that explicitly aborts the transaction. The XABORT instruction gives the programmer the ability to define other transactional abort conditions other than those explicitly designed into the processor hardware. In the case of XABORT, the EAX register will contain information provided by the XABORT instruction (e.g., describing the event that caused its execution)

Processors providing transactional support add to the complexity of debugging multi-threaded program code. As such, the improved processor 200 of FIG. 2 includes additional enhancements to the logging circuitry 201 that are designed to identify the existence of transactions and delineate chunks based on them. More specifically, additional hooks 230 within the cores are observed in FIG. 2 that are designed to: 1) detect execution of an instruction that signifies the beginning of a transaction's execution of speculative code (e.g., XACQUIRE or XBEGIN) and report the event to the logging circuitry 201; and, 2) detect execution of an instruction that signifies the end of a transaction's execution of speculative code (e.g., XRELEASE or XEND) and report the event to the logging circuitry 201. In response to either of these events, the logging circuitry 201 will terminate a chunk, create a packet that describes the chunk termination and report the packet out to system memory 203 (e.g., via memory controller 209).

Additionally, the new hooks 230 will report the existence of an aborted transaction. In response the logging circuitry 201 will terminate a chunk, create a packet that describes the chunk termination and write the packet out to system memory 203. Notably, in this approach, the detection of an abort for logging purposes rides off the conflict detection circuitry 221 within the processing cores 205 that actually detects conflicts for aborting transactions rather than on the memory race detection circuitry 207. The relationship between the conflict detection circuitry 221 and the memory race detection circuitry 207 is discussed in more detail below. In an implementation where the processor includes register space 222 that contains additional information describing an abort (e.g., the aforementioned EAX register space), the additional hooks 230 are further designed to report the information contained in the register space 222 to the logging circuitry 201. In processors that support an instruction that explicitly terminates a transaction (e.g., XABORT), a transaction abort packet will also be created and reported out (e.g., with EAX register content if available).

Figure 3A:
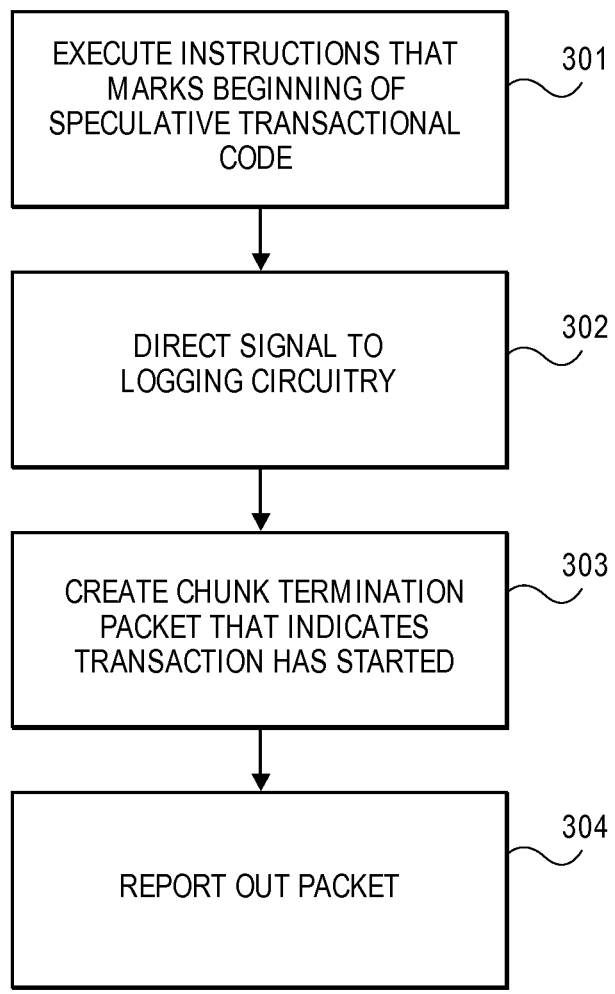
FIG. 3a shows a first method that can be executed by said processor.

FIG. 3a shows a first methodology performed by the processor of FIG. 2. As observed in FIG. 3a, an instruction is executed that marks the beginning of the execution of speculatively executed transactional code 301. In an embodiment the instruction is not deemed "executed" until it is retired. In response to the execution of the instruction, a signal is directed to logging circuitry 302. In response to the signal, the logging circuitry creates a chunk termination packet that indicates the chunk is being terminated because a transaction has started 303. The chunk termination packet is reported out 304 (e.g., by being written into external system memory).

Figure 3B:
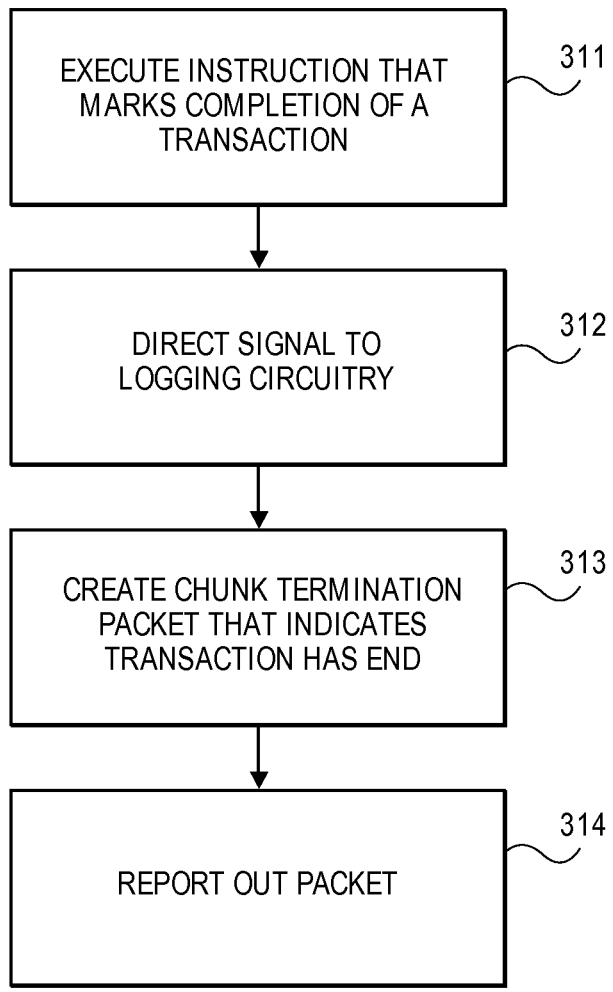
FIG. 3b shows a second method that can be executed by said processor.

FIG. 3b shows a second methodology performed by the processor of FIG. 2. As observed in FIG. 3b, an instruction is executed that marks the end of the execution of speculatively executed transactional code (e.g., after the transaction has successfully committed its data changes) 311. In an embodiment the instruction is not deemed "executed" until it is retired. In response to the execution of the instruction, a signal is directed to logging circuitry 312. In response to the signal, the logging circuitry creates a chunk termination packet that indicates the chunk is being terminated because a transaction has ended 313. The chunk termination packet is reported out 314 (e.g., by being written into external system memory).

Figure 3C:
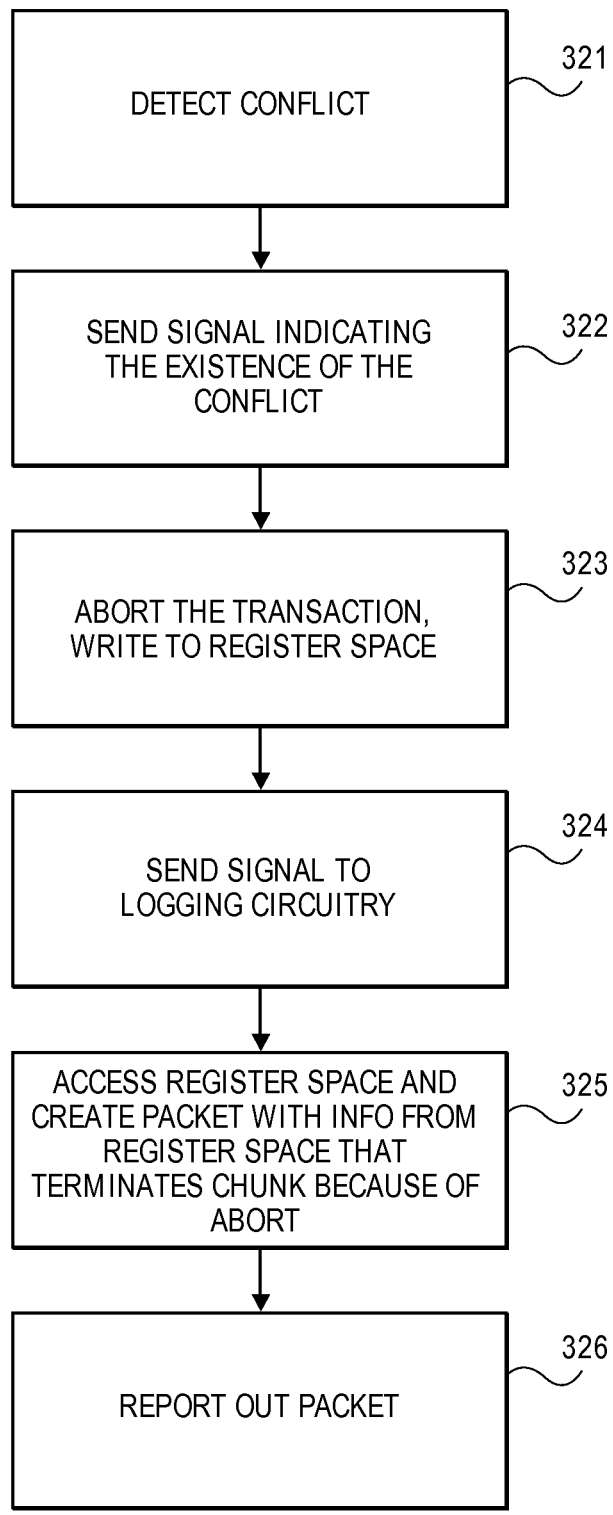
FIG. 3c shows a third method that can be executed by said processor.

FIG. 3c shows a third methodology performed by the processor of FIG. 2. As observed in FIG. 3c, hardware (e.g., conflict detection circuitry 221) detects that an access has been attempted by another thread to a memory location accessed by a transaction 321. A signal is sent indicating the existence of the conflict 322 (e.g., from conflict detection circuitry 222 to the processing core pipeline that is executing the transaction). In response to the signal, the transaction is aborted and information is written into control register space 323. In response to the abortion of the transaction, a signal is sent to logging circuitry 324. In response to the signal sent to the logging circuitry, the logging circuitry accesses the register space and creates a chunk termination packet that indicates the chunk is being terminated because a transaction has aborted and which includes information from the register 325. The chunk termination packet is reported out 326 (e.g., by being written into external system memory).

Figure 3D:
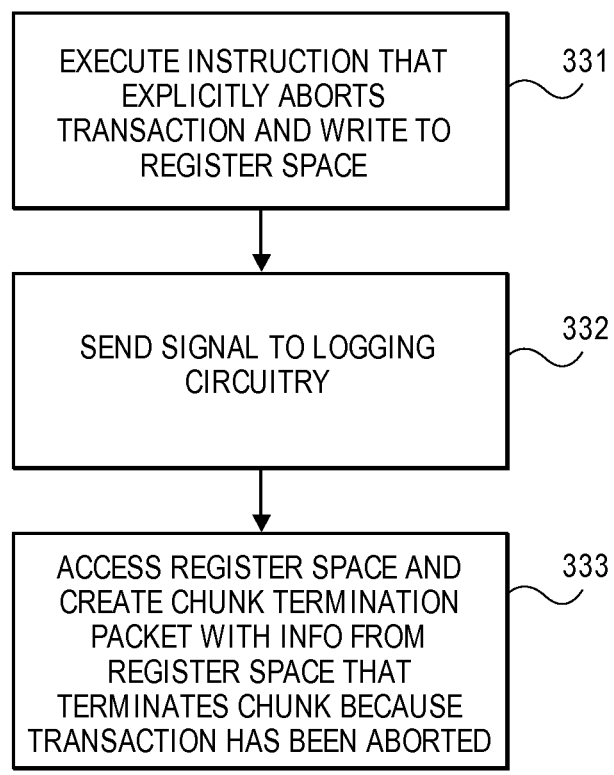
FIG. 3d shows a fourth method that can be executed by said processor.

FIG. 3d shows a fourth methodology performed by the processor of FIG. 2. As observed in FIG. 3d, an instruction is executed that explicitly aborts a transaction and information is written into a control register 331. In response to the abortion of the transaction, a signal is sent to logging circuitry 332. In response to the signal sent to the logging circuitry, the logging circuitry accesses the register and creates a chunk termination packet that indicates the chunk is being terminated because a transaction has aborted and which includes information from the register 333. The chunk termination packet is reported out 334 (e.g., by being written into external system memory).

Figure 4:
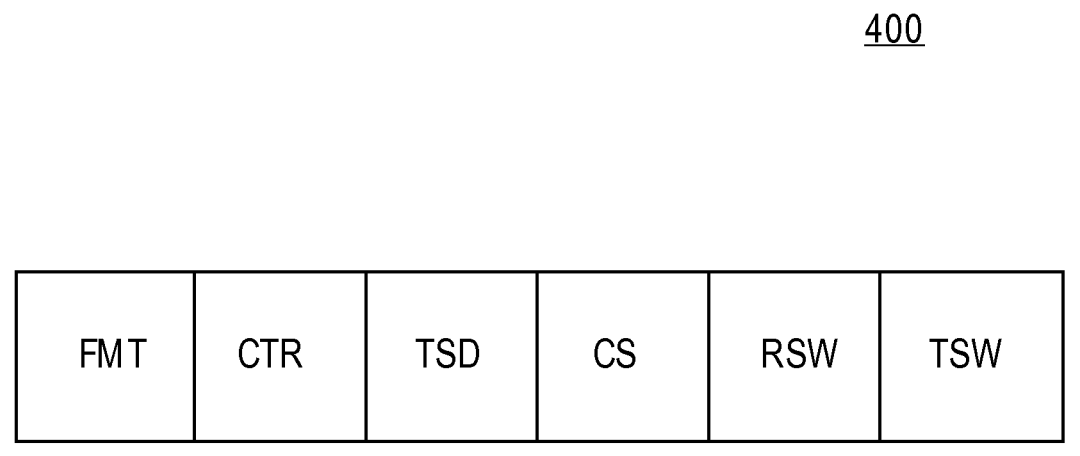

FIG. 4 shows an embodiment of a packet structure 400 that is written out by the logging circuitry 201 of FIG. 2 when writing out transaction related chunk termination packets. As observed in FIG. 4, the packet structure largely maintains the same structure as the prior art packet 120 of FIG. 1. Here, unlike the prior art packet 120, however, the chunk termination reason (CTR) field of the packet can contain information indicating any of the additional events: 1) transaction start; 2) transaction end; and, 3) transaction abort. In a further implementation, the CTR field can additionally indicate whether the processor supports an explicit abort instruction (e.g., XABORT).

An additional improvement over and above the packet structure of FIG. 1 is that the number of retired load/store operations of the oldest not yet retired macro instruction information (NTB in packet 120 of FIG. 1) is replaced with a "transaction status word" (TSW) that provides additional information describing the chunk termination for transactions.

In an implementation, the TSW contains the contents of the (e.g., EAX) control register in the case of a transaction abort, or, the contents of a "transaction nested counter" register (not depicted) in the case of a transaction start or transaction end. In the case of a transaction abort, in an embodiment, the contents of the EAX control register indicate: 1) if the abort is from an XABORT instruction; 2) whether the transaction may succeed on retry; 3) if the abort is from a conflict; 4) if the abort is from an overflow; 5) if the abort is from a debug breakpoint; 6) whether the aborted transaction is nested. For nested transactions, the processor is designed to support a string of transactions within a transaction (e.g., a first transaction can start another transaction and so on). The transaction nested counter value within its reserved register space essentially keeps track of which inner transaction (if any) the current transaction pertains to.

In an implementation, the memory race detection circuitry 207 (part of the prior art logging technology of FIG. 1) can be enabled while the special hooks for transaction abort detection 230 and logging are also enabled. This can be achieved by designing the processor 200 of FIG. 2 with a mode that permits both the new transactional hooks 230 and the memory race hooks to both be enabled and active at the same time. This permits, for example, all conflicts to have potentially occurred within a transaction to be recorded (e.g., because the memory race hooks cause the logging circuitry 201 to report out on any detected conflicts during execution of the transaction (notably, a memory race condition and a conflict are similar events)). This additional information may be particularly useful in an implementation where the control register information that is provided commensurate with an abort (e.g., the aforementioned EAX register) does not specify the specific memory address having the conflict that caused the transaction to abort (in other alternative implementations, the conflict detect circuitry 222 can be modified to report this information for entry into the register space).

Also, the TSW information of a chunk termination packet can include information pertaining to an abort as to whether or not the memory race detection circuitry 207 detected any conflicts. If not, it is suggestive that the conflict detection circuitry 221 that aborted the transaction actually experienced a "false positive" conflict. In an implementation, false positives are possible at the conflict detection circuitry 221 because of the fact that caches (such as an L1 cache) use hashing circuits to determine where a cached item of data is to be stored and, typically, multiple different memory addresses can hash to a same caching storage location. In a further implementation, the memory race detection circuitry 207 is also capable of generating false positives for similar reasons—although the hashing and storage of memory addresses can be different in the memory race detection circuitry (e.g., a bloom filter is used to keep the read and write sets and memory addresses are hashed to a specific bloom filter location) than in the caching circuitry where the transaction conflict detection circuitry 221 resides. As such, in this case, if the memory race detection circuitry reports any conflicts they cannot be completely relied upon for detecting transactional aborts.

In a further embodiment, the CTR information of a transaction related chunk termination packet indicates whether the transaction was terminated because of a late lock acquire (LLA). A late lock acquire is a special circumstance that permits a transaction to commit its data even though the transaction has not completed. Typically LLAs are imposed when the transaction needs to be "paused", e.g., in response to an exception or unsafe instruction so that its state can be externally saved. After the transaction's state is externally saved, the transaction resumes normal operation. In this case, again, hooks within the processing cores report out the occurrence of any LLA event to the logging circuitry 201 which reports out a chunk termination event pertaining to the LLA and its termination of the transaction.

The logging circuitry 201 can be implemented in any number of ways. At a first extreme the logging circuitry 201 can be implemented completely in dedicated, custom logic circuitry. At another extreme the logging circuitry 201 can be implemented as a micro-controller or other form of program code execution circuitry that executes program code (e.g., firmware) to perform its various functions. Other blends between these two extremes are also possible.

As any of the logic processes taught by the discussion above may be performed with a controller, micro-controller or similar component, such processes may be implemented with program code such as machine-executable instructions that cause a machine that executes these instructions to perform certain functions.

It is believed that processes taught by the discussion above may also be described in source level program code in various object-orientated or non-object-orientated computer programming languages. An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 5:
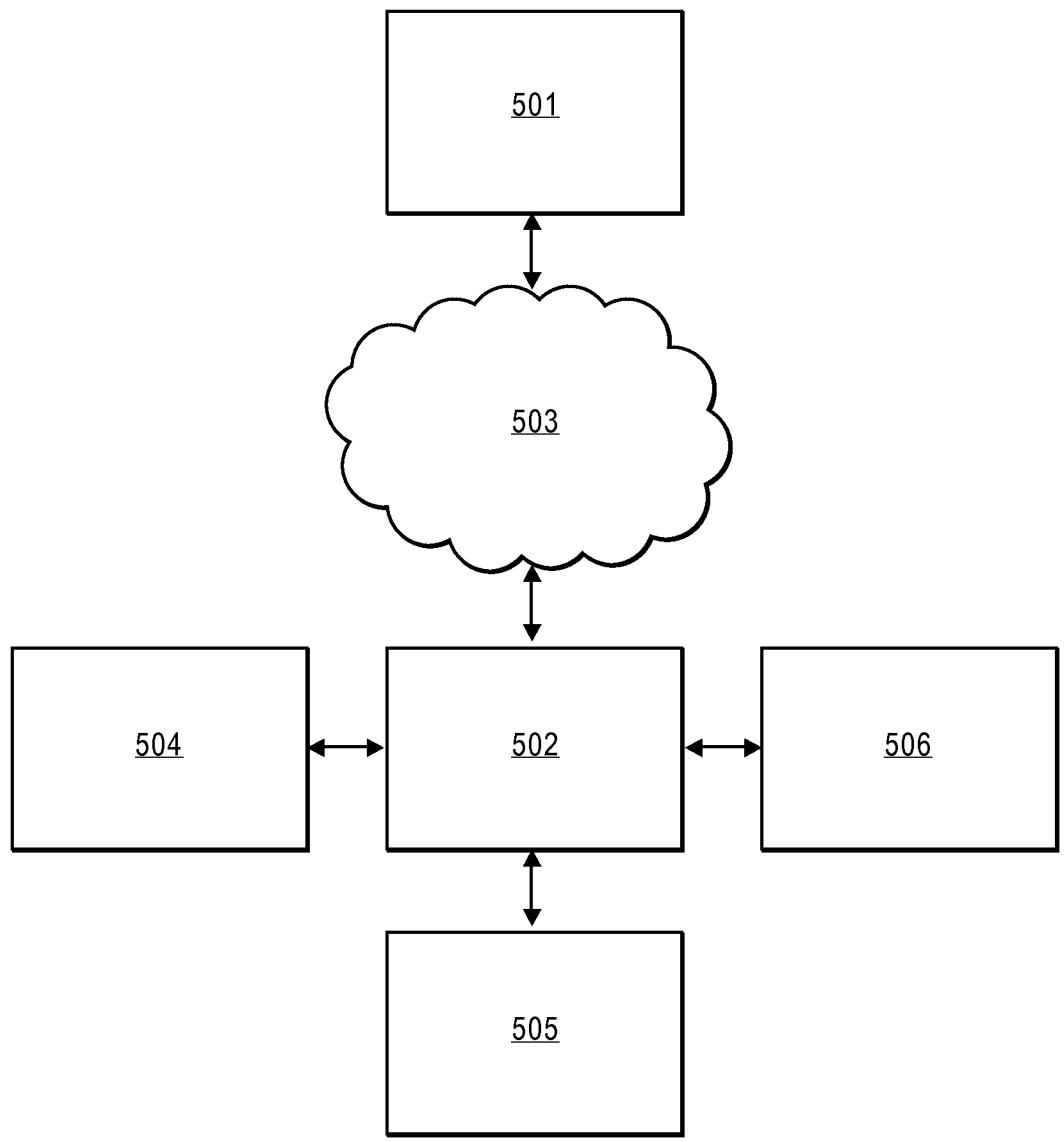
FIG. 5 shows a computing system.

FIG. 5 shows an embodiment of a computing system (e.g., a computer). The computer includes one or more processors 501 such as the processor 200 of FIG. 2 or at least one or more processors having transactional related logging circuitry functionality as discussed above. In the case of multiple processors 501, the processors communicate to one another and a memory controller 502 through an interconnection network 503. A graphics processor 504 can be coupled to the interconnection network 503 or the memory controller 502 directly. Likewise, an I/O hub 505 can be coupled to the interconnection network 503 or the memory controller 502, directly. The memory controller is coupled to a system memory 506.

The above description describes a processor, including: memory access conflict detection circuitry to identify a conflict pertaining to a transaction being executed by a thread that believes it has locked information within a memory; logging circuitry to construct and report out a packet if the memory access conflict detection circuitry identifies a conflict that causes the transaction to be aborted. In an embodiment the processor includes register space to store information pertaining to the transaction's abort. In an embodiment the packet includes information from the register space. In an embodiment the information indicates that the transaction was aborted because the memory access conflict detection circuitry detected a conflict. In an embodiment the processor comprises a memory race detection circuit to detect memory races, the logging circuitry to construct and report out a packet if the memory race detection circuit detects a memory race. In an embodiment the processor is designed to permit the logging circuitry to be concurrently responsive to both the memory access conflict detection circuitry and the memory race detection circuit. In an embodiment the processor supports an instruction that explicitly aborts a transaction, the logging circuitry to report out a second packet if the instruction is executed. In an embodiment the processor supports an instruction that marks the beginning of a transaction, the logging circuitry to report out a second packet if the instruction is executed. In an embodiment the processor supports an instruction that marks the end of a successfully completed transaction, the logging circuitry to report out a second packet if the instruction is executed.

A method is described that includes: executing an instruction that marks the beginning a transaction, the instruction being part of a thread that believes it has a lock on information within a memory; constructing and reporting out a logging packet in response to the executing of the instruction; and, constructing and reporting out a second logging packet in response to the transaction having ended. In an embodiment the transaction has successfully completed and the constructing and reporting out the second packet is responsive to execution of a second instruction that marks successful completion of the transaction. In an embodiment the transaction has been aborted and the constructing and reporting out of the second packet is responsive to execution of a second instruction that explicitly aborted the transaction. In an embodiment the transaction has been aborted because a memory access conflict was detected. In an embodiment the method further includes detecting a memory race while the transaction is executing. In an embodiment the method further includes constructing and reporting out a third logging packet in response to the detection of the memory race.

A computing system, is described that includes: a) a processor, the processor comprising: memory access conflict detection circuitry to identify a conflict pertaining to a transaction being executed by a thread that believes it has locked information within a memory; logging circuitry to construct and report out a packet if the memory access conflict detection circuitry identifies a conflict that causes the transaction to be aborted; and, b) a memory controller coupled to the memory. In an embodiment the processor supports an instruction that explicitly aborts a transaction, the logging circuitry to report out a second packet if the instruction is executed. In an embodiment the processor supports an instruction that marks the beginning of a transaction, the logging circuitry to report out a second packet if the instruction is executed. In an embodiment the processor supports an instruction that marks the end of a successfully completed transaction, the logging circuitry to report out a second packet if the instruction is executed. In an embodiment the processor includes register space to store information pertaining to the transaction's abort and the packet includes information from the register space.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
   identifying a conflict pertaining to a transaction being executed by a thread; and
   constructing and reporting out a packet when identifying a conflict that causes an abort of said transaction, wherein the packet includes content that describes a reason for the abort of the transaction, the packet format includes a field to indicate any of a transaction start, a transaction end, and the abort, and the content is reported in response to the abort;
   reporting out a second packet when detecting a memory race;
   decoding a first instruction into a decoded first instruction;
   executing the decoded first instruction to mark a beginning of a transaction;
   reporting out a third packet when the decoded first instruction is executed;
   decoding a second instruction into a decoded second instruction;
   executing the decoded second instruction to mark an end of a transaction; and
   reporting out a fourth packet when the decoded second instruction is executed.

2. The method of claim 1 wherein the reason is an abort from an overflow.

3. The method of claim 1 wherein said content indicates whether an aborted transaction is nested.

4. The method of claim 1 further comprising executing an instruction that explicitly aborts a transaction, wherein the reason indicates the abort is from the instruction.

5. The method of claim 1 wherein the content indicates whether the transaction may succeed on a retry.

6. The method of claim 1 wherein both the identifying the conflict that causes the abort of said transaction and the detecting the memory race are false positives.

7. The method of claim 1 wherein the identifying the conflict that causes the abort of said transaction is a false positive.

8. The method of claim 1 wherein the detecting the memory race is a false positive.

9. The method of claim 1 wherein the reason is an abort from a debug breakpoint.

10. A processor comprising:
    memory access conflict detection circuitry to identify a conflict pertaining to a transaction being executed by a thread;
    logging circuitry to construct and report out a packet if said memory access conflict detection circuitry identifies a conflict that causes an abort of said transaction, wherein the packet includes content that describes a reason for the abort of the transaction, the packet format includes a field to indicate any of a transaction start, a transaction end, and the abort, and the content is reported to the logging circuitry in response to the abort; and
    a memory race detection circuit to detect memory races, said logging circuitry to construct and report out a second packet if said memory race detection circuit detects a memory race, wherein said processor is to permit said logging circuitry to be concurrently responsive to both said memory access conflict detection circuitry and said memory race detection circuit, said processor supports a first instruction that marks a beginning of a transaction, said logging circuitry to report out a third packet if said first instruction is executed, and said processor supports a second instruction that marks an end of a successfully completed transaction, said logging circuitry to report out a fourth packet if said second instruction that marks the end is executed.

11. The processor of claim 10 wherein the reason is an abort from an overflow.

12. The processor of claim 10 wherein said content indicates whether an aborted transaction is nested.

13. The processor of claim 10 wherein said processor supports an instruction that explicitly aborts a transaction, and the reason indicates the abort is from the instruction.

14. The processor of claim 10 wherein the content indicates whether the transaction may succeed on a retry.

15. The processor of claim 10 wherein both said memory access conflict detection circuitry and said memory race detection circuit are capable of generating false positives.

16. The processor of claim 10 wherein said memory access conflict detection circuitry is capable of generating false positives.

17. The processor of claim 10 wherein said memory race detection circuit is capable of generating false positives.

18. The processor of claim 10 wherein the reason is an abort from a debug breakpoint.

19. A computing system comprising:
a processor;
memory access conflict detection circuitry to identify a conflict pertaining to a transaction being executed by a thread on information within a memory;
logging circuitry to construct and report out a packet if said memory access conflict detection circuitry identifies a conflict that causes an abort of said transaction wherein the packet includes content that describes a reason for the abort of the transaction, the packet format includes a field to indicate any of a transaction start, a transaction end, and the abort, and the content is reported to the logging circuitry in response to the abort;
a memory controller coupled to said memory; and
a memory race detection circuit to detect memory races, said logging circuitry to construct and report out a second packet if said memory race detection circuit detects a memory race, wherein said processor is to permit said logging circuitry to be concurrently responsive to both said memory access conflict detection circuitry and said memory race detection circuit, said processor supports a first instruction that marks a beginning of a transaction, said logging circuitry to report out a third packet if said first instruction is executed, and said processor supports a second instruction that marks an end of a successfully completed transaction, said logging circuitry to report out a fourth packet if said second instruction that marks the end is executed.

20. The computing system of claim 19 wherein said processor supports an instruction that explicitly aborts a transaction, and the reason indicates the abort is from the instruction.

21. The computing system of claim 19 wherein the reason is an abort from an overflow.

22. The computing system of claim 19 wherein both said memory access conflict detection circuitry and said memory race detection circuit are capable of generating false positives.

23. The computing system of claim 19 wherein the reason is an abort from a debug breakpoint.

24. The computing system of claim 19 wherein the content indicates whether the transaction may succeed on a retry.

* * * * *